United States Patent [19]

Ceccon et al.

[11] Patent Number: 5,029,791
[45] Date of Patent: Jul. 9, 1991

[54] OPTICS X-Y POSITIONER

[75] Inventors: Harry L. Ceccon, Boston; Horace Furumoto, Wellesley, both of Mass.

[73] Assignee: Candela Laser Corporation, Wayland, Mass.

[21] Appl. No.: 490,755

[22] Filed: Mar. 8, 1990

[51] Int. Cl.$^5$ .......................................... F16M 13/00
[52] U.S. Cl. .................................... 248/287; 248/913; 350/531
[58] Field of Search .................... 248/287, 178, 476; 350/319, 531, 90; 108/137

[56] References Cited

U.S. PATENT DOCUMENTS

| | | | |
|---|---|---|---|
| 4,077,722 | 3/1978 | Bicskei | 248/913 X |
| 4,126,376 | 11/1978 | Gommel | 350/531 |
| 4,772,109 | 9/1988 | Cutberth | 248/913 X |

FOREIGN PATENT DOCUMENTS 436394  12/1974  U.S.S.R. ............................. 248/178

OTHER PUBLICATIONS

IBM Technical Disclosure Bulletin, vol. 12, No. 11, 1970 (Apr.), "Step and Repeat Micropositioning Table", Rabstejnek.
Candela Laser Corporation, X-Y Positioner Model No. 7040-00-3460 date unknown.
Daedal Precision Positioning Equipment, "Positioning Systems and Components", date unknown.
Newport Catalog, Precision Laser & Optics Products, date unknown.

Primary Examiner—Ramon O. Ramirez
Assistant Examiner—Robert A. Olson
Attorney, Agent, or Firm—Hamilton, Brook, Smith & Reynolds

[57] ABSTRACT

An optics X-Y positioner has an optics support positioned within a housing having sides and front and rear walls. The optics support has a groove on one face which rides in an X direction along a ridge in a sliding guide plate. The guide plate slides within a flat groove in the Y direction in the rear wall of the housing. X and Y direction adjustment screws extend through sides of the frame and abut the optics support. A spring in tension is wrapped about the optics support in a circumferential groove to force the optics support against the adjustment screws.

12 Claims, 3 Drawing Sheets

OPTICS X-Y POSITIONER

BACKGROUND OF THE INVENTION

X-Y positioning of an element is often obtained by X and Y tables mounted to a fixed support. Typically, one of the tables is driven relative to the fixed support by a threaded screw, and the other table is driven in a perpendicular direction relative to the first table by a second screw. The screws may be motor driven.

In many optical systems, it is critical that two elements be properly aligned in a plane perpendicular to the optic axis. For example, it may be necessary to precisely align an end face of an optic fiber relative to a laser beam. To accomplish that precise alignment, the X-Y table concept has been adapted to optics systems. In those systems, an optic element such as a fiber, aperture or lens is positioned in the second table. The optic axis passes through the optic element as well as windows in the first table, second table and fixed support.

SUMMARY OF THE INVENTION

The present invention is directed toward an X-Y positioner, suitable for use in positioning optic elements, which is more compact, more easily fabricated and less expensive than prior optic element X-Y positioners.

In accordance with the present invention, a housing has a rear wall, sides and a front wall. At least one wall has a window therein. A guide plate within the housing slides against the rear wall in a Y direction. The guide plate is restrained from movement in a perpendicular X direction by Y direction restraining elements in the rear wall. The guide plate itself has an X direction restraining element formed therein along an axis in the X direction. An adjustable member, such as an optics support, is positioned for sliding movement between the front plate and guide plate. The adjustable member has an X direction restraining element in its rear face which is complementary with the restraining element of the guide plate. A Y direction adjustment screw is threaded through a first side of the housing and abuts the adjustable member to force the adjustable member in a Y direction. An X direction adjustment screw is threaded through an adjacent second side of the housing and abuts the adjustable member to force the adjustable member in an X direction. A spring assembly forces the adjustable member toward the X and Y direction adjustment screws.

In a preferred implementation of the invention as an optics positioner, a window is formed through both walls, the guide plate and the adjustable optics support. The Y direction restraining element is a flat groove in which the guide plate is seated. The guide plate is sheet metal and the X direction restraining element formed therein is a ridge pressed into the sheet metal. The X direction restraining element in the adjustable optics support is a complementary groove. The spring assembly is a spring in tension between the first and second sides of the housing. The spring is wrapped about the adjustable optics support within a curved circumferential groove of the optics support. An optic element is retained within the optics support by a set screw which is accessible through an opening in a side of the housing.

BRIEF DESCRIPTION OF THE DRAWINGS

The foregoing and other objects, features and advantages of the invention will be apparent from the following more particular description of a preferred embodiment of the invention, as illustrated in the accompanying drawings in which like reference characters refer to the same parts throughout the different views. The drawings are not necessarily to scale, emphasis instead being placed upon illustrating the principles of the invention.

DESCRIPTION OF A PREFERRED EMBODIMENT

Figure 1:
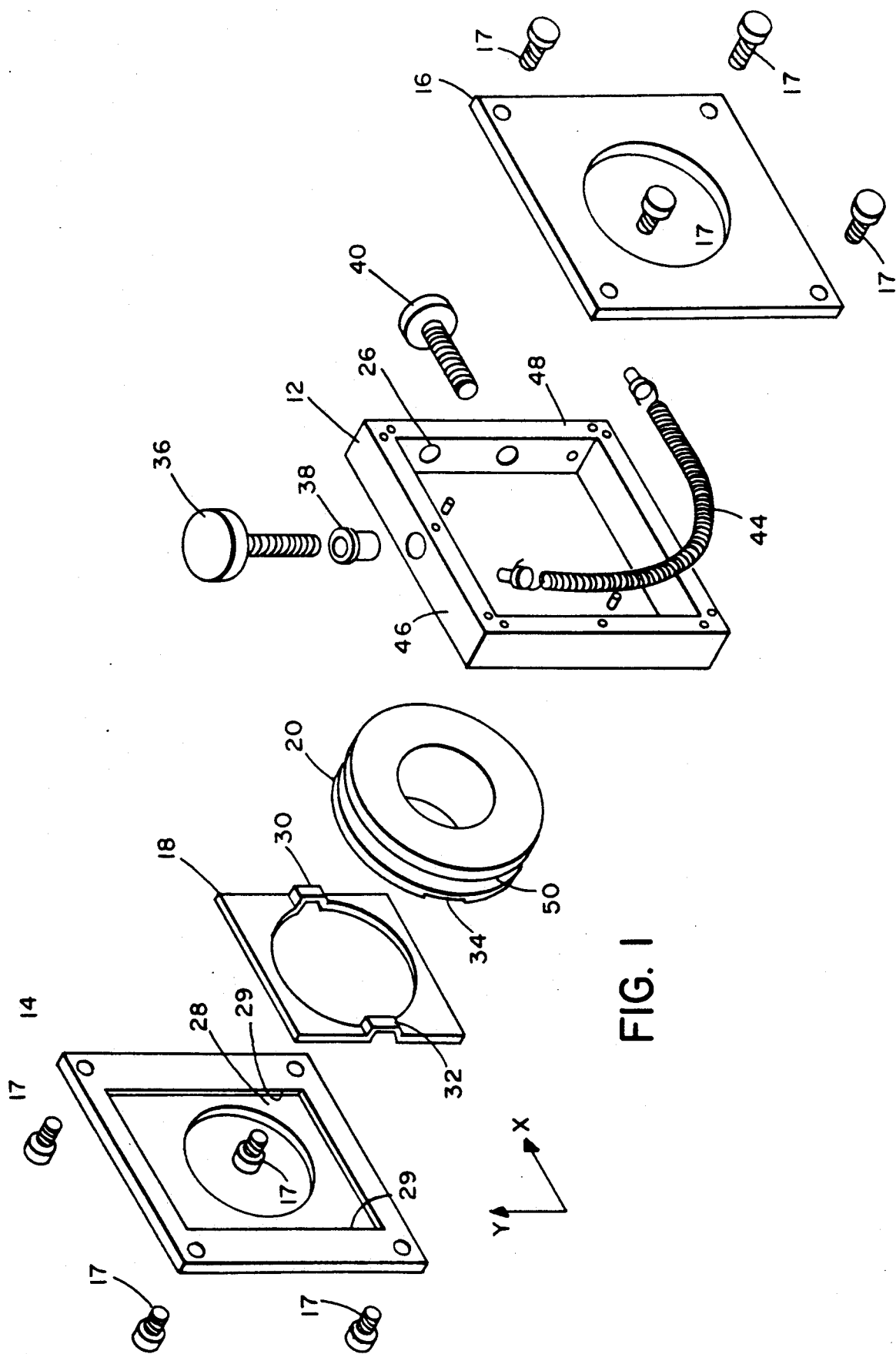
FIG. 1 is an exploded perspective view of an optics X-Y positioner embodying the present invention.

As illustrated in the figures, the optics X-Y positioner of the present invention includes a housing which is formed of a frame 12 of four sides, a rear plate 14 and a front plate 16. Mounted within the housing in a manner to be described are a guide plate 18 and an adjustable optics support 20. Each member has an opening therein to form a window. The front and rear plate 16 and 14 are joined to the frame 12 by screws 17.

Figure 2:
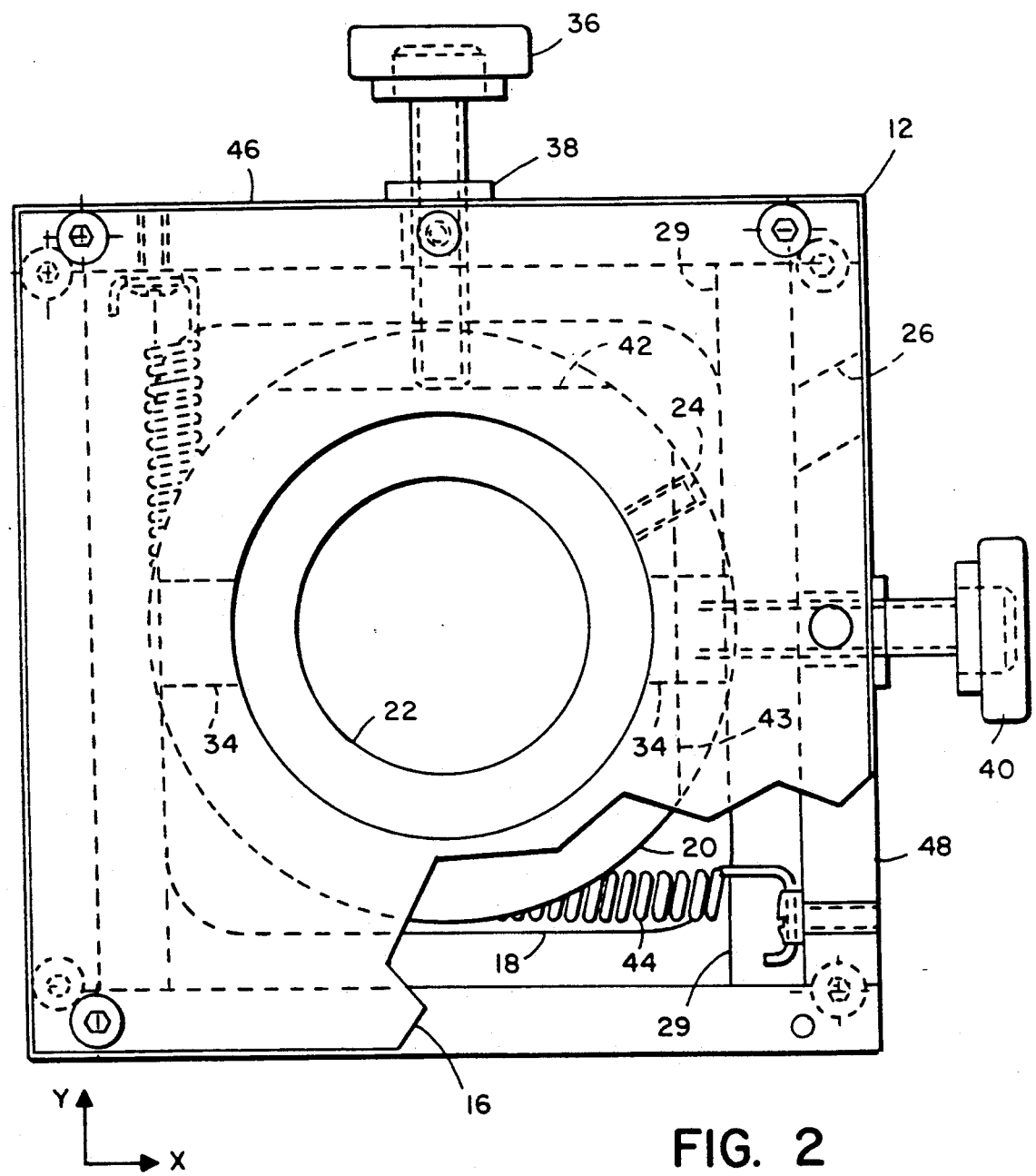
FIG. 2 is a front view of the assembled X-Y positioner of FIG. 1 partially broken away.
Figure 3:
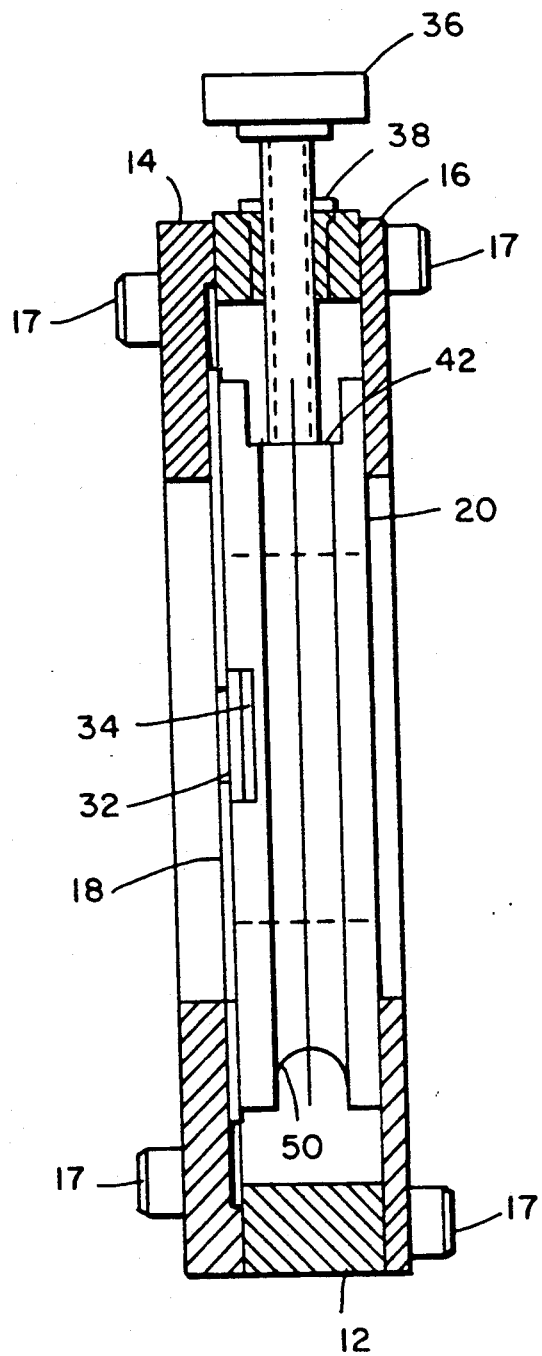
FIG. 3 is a side cross-sectional view of the assembly of FIG. 2.

Not shown in FIG. 1 but as illustrated in FIG. 2, an optic element 22 may be retained within the optics support 20. In the case shown in FIG. 2, the optic element is simply an aperture. Alternatively, a lens or a fiber connector could be retained within the optics support. The aperture 22 is retained by a set screw 24 in the optics support accessible through an opening 26 in a side of the frame.

The guide plate 18 is seated in a flat groove 28, having sides 29, in the face of the rear plate 14. The width of the plate 18 closely matches the width of the groove to restrain the plate from movement in an X direction. However, the height of the groove as viewed in FIG. 1 is greater than that of the plate 18 so that the plate is free to slide in the groove in the Y direction.

The plate 18 is formed of sheet metal and has raised portions 30 and 32 formed therein to form a ridge which extends along an X axis. A complementary groove 34 is formed in the rear surface of the optics support 20. The ridge 30, 32 seated in the groove 34 restrains the optics support 20 from Y direction movement relative to the guide plate 18 but allows for X direction movement.

The X and Y position of the optics support 20 is determined by a Y direction adjustment screw 36 threaded into a collar 38 seated in a side 46 of the frame 12. X direction adjustment is by means of an X direction adjustment screw 40 threaded into an adjacent side 48 of the frame 12. Each screw rests against a flat 42 or 43 formed in a circumferential groove about the optics support. The optics support is forced against the two adjustment screws by a spring 44 which is joined to each of the sides 46 and 48 and wrapped about the optics support 20 in a circular groove 50. The entire assembly is closed by the front plate 16.

In operation, adjustment of screw 36 forces the optics support 20 with the guide plate 18 downward against the spring 44 or allows the spring to force the element 20 upward against the screw 36. The guideplate 18 slides in the groove 28 in the rear plate 14. With adjustment of screw 40, the optics support 20 slides along the ridge 30, 32 against the spring 44.

While this invention has been particularly shown and described with references to a preferred embodiment thereof, it will be understood by those skilled in the art that various changes in form and details may be made therein without departing from the spirit and scope of the invention as defined by the appended claims.

We claim:

1. An X-Y positioner comprising a housing having a rear wall, sides and a front wall, at least one wall having a window therein;

a guide plate within the housing, the guide plate sliding against the rear wall in the Y direction and being restrained from movement in a perpendicular X direction by a Y direction restraining element in the rear wall, the guide plate having an X direction restraining element formed therein along an axis in the X direction;

an adjustable member positioned for sliding movement between the front plate and guide plate, the adjustable member having in a rear face an X direction restraining element extending in the X direction and complementary with the restraining element of the guide plate;

a Y direction adjustment screw threaded through a first side of the housing and abutting the adjustable member to force the adjustable member in a Y direction;

an X direction adjustment screw threaded through an adjacent second side of the housing and abutting the adjustable member to force the adjustable member in an X direction; and a spring assembly for forcing the adjustment member toward the X and Y direction adjustment screws.

2. An X-Y positioner as claimed in claim 1 wherein a window is formed through both walls, the guide plate and the adjustable member.

3. An X-Y positioner as claimed in claim 1 wherein the Y direction restraining element in the rear wall is a flat groove in which the guide plate is seated.

4. An X-Y positioner as claimed in claim 1 wherein the X direction restraining element in the guide plate is a ridge and the X direction restraining element in the adjustable member is a groove.

5. An X-Y positioner as claimed in claim 1 wherein the spring assembly comprises a spring in tension between adjacent sides of the housing and wrapped about the adjustable member within a curved groove of the adjustable member.

6. An X-Y positioner as claimed in claim 1 further comprising a set screw in the adjustable member accessible through an opening in a side of the housing, the set screw retaining a driven member within the adjustable member.

7. An X-Y positioner as claimed in claim 1 wherein the adjustable member is an optics support.

8. An X-Y positioner as claimed in claim 1 wherein the guide plate is a sheet metal plate and the X direction restraining element is a ridge pressed into the plate.

9. A optics X-Y positioner comprising:

a housing comprising a rear wall, sides and a front wall, the front and rear walls having windows therein;

a guide plate within the housing having a window therein, the guide plate being seated within a flat groove in the rear wall which extends in a Y direction, the guide plate sliding against the rear wall in the Y direction and being restrained from movement in a perpendicular X direction by walls of the flat groove, the guide plate having a ridge formed therein along an axis in the X direction;

an adjustable optics support positioned for sliding movement between the front plate and guide plate, the optics support having a groove in a rear face extending in the X direction and in which the ridge of the guide plate is seated;

an X direction adjustment screw threaded through a first side of the housing and abutting the optics support to force the optics support in a Y direction;

an X direction adjustment screw threaded through an adjacent second side of the housing and abutting the optics support to force the optics support in an X direction; and a spring in tension between the first and second sides of the housing and wrapped about the optics support within a curved groove of the optics support to force the optics support toward the X and Y direction adjustment screws.

10. An optics X-Y positioner as claimed in claim 9 wherein the guide plate is sheet metal and the ridge is pressed into the sheet metal.

11. An optics X-Y positioner as claimed in claim 9 further comprising a set screw in the optics support accessible through an opening in a side of the housing for retaining an optic element within the optics support.

12. An optics X-Y positioner as claimed in 11 wherein the guide plate is sheet metal and the ridge is pressed into the sheet metal.

* * * * *